US010723881B2

(12) United States Patent
Hoek et al.

(10) Patent No.: US 10,723,881 B2
(45) Date of Patent: Jul. 28, 2020

(54) PROCESS TO PREPARE A HEAVY PARAFFIN WAX

(71) Applicant: SHELL OIL COMPANY, Houston, TX (US)

(72) Inventors: Arend Hoek, Amsterdam (NL); Antonius Adrianus Maria Roovers, Pulua Bukom (SG); Kaushik Majumder, Bangalore (IN)

(73) Assignee: SHELL OIL COMPANY, Houston, TX (US)

( * ) Notice: Subject to any disclaimer, the term of this patent is extended or adjusted under 35 U.S.C. 154(b) by 200 days.

(21) Appl. No.: 15/540,267

(22) PCT Filed: Dec. 29, 2015

(86) PCT No.: PCT/EP2015/081331
§ 371 (c)(1),
(2) Date: Jun. 28, 2017

(87) PCT Pub. No.: WO2016/107861
PCT Pub. Date: Jul. 7, 2016

(65) Prior Publication Data
US 2017/0355852 A1  Dec. 14, 2017

(30) Foreign Application Priority Data

Dec. 31, 2014 (EP) .................................... 14200716

(51) Int. Cl.
| | |
|---|---|
| *C08L 91/06* | (2006.01) |
| *C08L 91/08* | (2006.01) |
| *C10G 45/02* | (2006.01) |
| *C10G 65/04* | (2006.01) |
| *C10G 73/36* | (2006.01) |
| *C10G 73/44* | (2006.01) |
| *C10G 2/00* | (2006.01) |

(52) U.S. Cl.
CPC .............. *C08L 91/06* (2013.01); *C08L 91/08* (2013.01); *C10G 2/32* (2013.01); *C10G 45/02* (2013.01); *C10G 65/04* (2013.01); *C10G 73/36* (2013.01); *C10G 73/44* (2013.01); *C10G 2300/1022* (2013.01)

(58) Field of Classification Search
CPC .................................. C08L 91/06; C08L 91/08
See application file for complete search history.

(56) References Cited

U.S. PATENT DOCUMENTS

| | | | | |
|---|---|---|---|---|
| 2,073,080 A | * | 3/1937 | van Peski | ............... C10M 1/08 208/19 |
| 2,692,835 A | | 10/1954 | Capell et al. | |
| 3,778,288 A | * | 12/1973 | Ridge et al. | ............. C08J 3/203 106/502 |
| 6,858,127 B2 | | 2/2005 | Hoek et al. | |
| 2013/0209709 A1 | | 8/2013 | Schneider et al. | |

FOREIGN PATENT DOCUMENTS

| | | | |
|---|---|---|---|
| DE | 102010044319 A1 | 3/2012 | |
| EP | 0579330 A1 | 1/1994 | |
| EP | 1498469 A2 | 1/2005 | |
| WO | 9612778 A1 | 5/1996 | |
| WO | WO-9612778 A1 * | 5/1996 | ............. C10G 65/04 |
| WO | 0011113 A1 | 3/2000 | |
| WO | 02102941 A2 | 12/2002 | |
| WO | 03070857 A1 | 8/2003 | |
| WO | 2004009739 A2 | 1/2004 | |
| WO | 2007082589 A1 | 7/2007 | |
| WO | 2013064539 A1 | 5/2013 | |
| ZA | 9900253 B | 7/2000 | |

OTHER PUBLICATIONS

Fischer-Tropsch Hard Waxes (Sasol Wax (Feb. 2010)) available at http://overlack.in.ua/files/Fisher_Tropsh_waxes.pdf.*
Sasolwax H1 Product Data Sheet (Revision 17, Sasol Chemicals (Jul. 30, 2018)) available at https://sasoldcproducts.blob.core.windows.net/documents/Product%20Datasheets/472e0e90-c87f_ZA_Sasolwax%20H1_EN-ZA.pdf.*
International Search Report and Written Opinion received for PCT Patent Application No. PCT/EP2015/081331, dated Mar. 30, 2016, 13 pages.
Anonymous, "Sasolwax—Rubber & Tyre", Retrieved from the Internet: URL:http://www.sasolwax.com/en/Applications/Industrial+Waxes/Rubber+_+Tyre.html, Sasolwax, 2 pages, Dec. 22, 2009, XP055202035.
Anonymous, "Sasolwax—Chemistry & Blending", Retrieved from the Internet: URL:http://www.sasolwax.com/en/Applications/Industrial+Waxes/Chemistry+_+Blending.html, Sasolwax, 2 pages, Oct. 22, 2009, XP055202036.
Anonymous, "Sasolwax—Construction & Insulation", Retrieved from the Internet: URL:http://www.sasolwax.com/en/Applications/Industrial+Waxes/Construction+_+Insulation.html, Sasolwax, 2 pages, Oct. 22, 2009, XP055202037.
Anonymous, "Sasolwax—Paper & Packaging", Retrieved from the Internet: URL:http://www.sasolwax.com/en/Applications/Industrial+Waxes/Paper+_+Packaging.html, Sasolwax, 2 pages, Oct. 22, 2009, XP055202038.
Rase, "Handbook of Commercial Catalysts: Heterogeneous Catalysts", CRC Press LLC, Florida, Mar. 24, 2000, ISBN 0-8493-9417-1, 3 pages.
Gorak et al., "Vacuum and High-Pressure Distillation", Distillation: Operations and Applications, Elsevier Inc, 1st Edition, Chapter 9.1, Oxford, Jul. 18, 2014.

* cited by examiner

*Primary Examiner* — Randy Boyer

(57) ABSTRACT

The present invention provides a paraffin wax having a congealing point according to ASTM D938 of at least 100° C. and a Saybolt colour according to ASTM D156 of at least 25 cm.

16 Claims, 1 Drawing Sheet

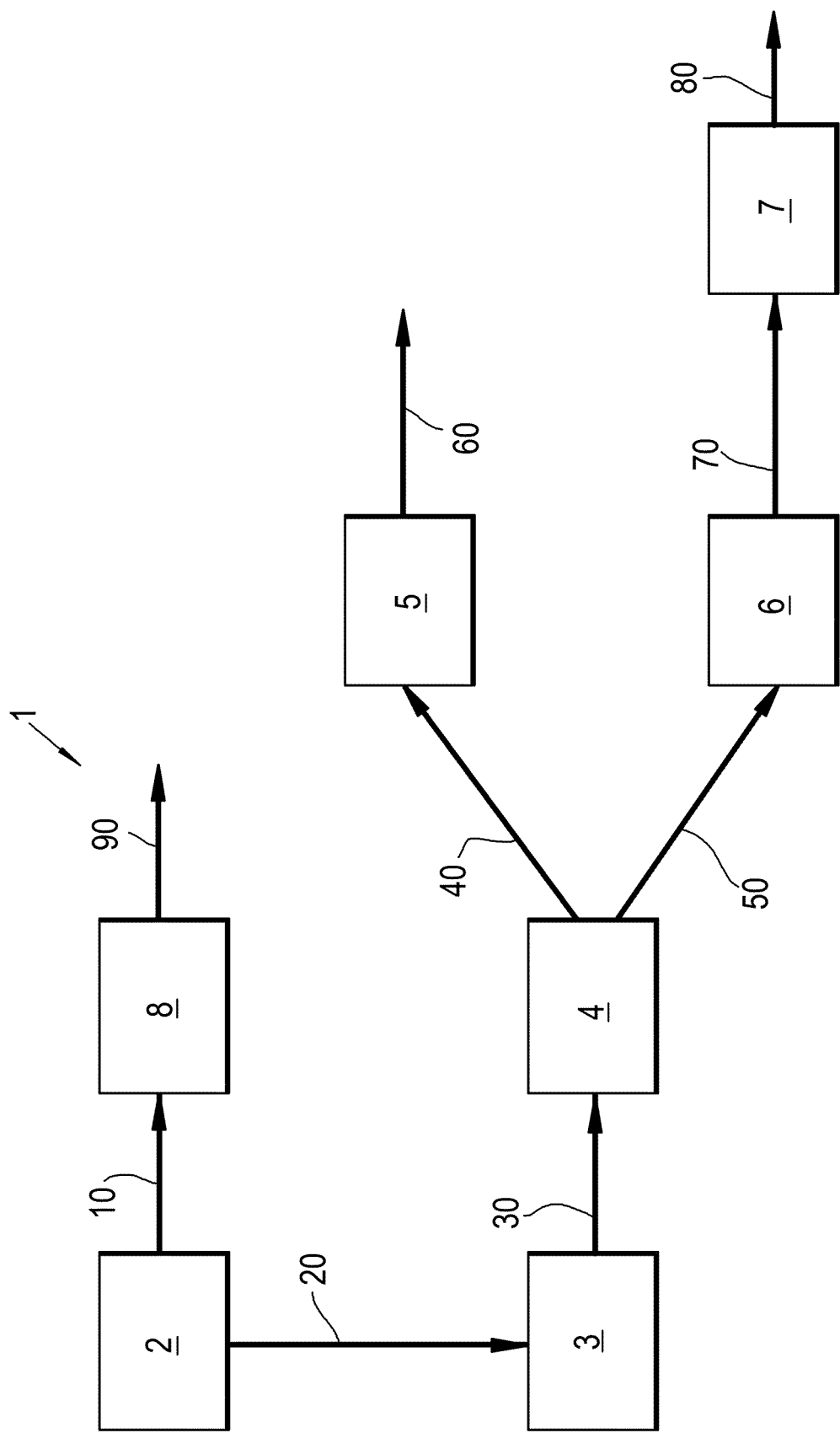

PROCESS TO PREPARE A HEAVY PARAFFIN WAX

PRIORITY CLAIM

The present application is the National Stage (§ 371) of International Application No. PCT/EP2015/081331, filed Dec. 29, 2015, which claims priority from European Patent Application No. 14200716.0, filed Dec. 31, 2014 incorporated herein by reference.

The present invention provides a heavy paraffin wax and a process to prepare said paraffin wax.

Paraffin wax may be obtained by various processes. U.S. Pat. No. 2,692,835 discloses a method for deriving paraffin wax from crude oil. Also, paraffin wax may be obtained using the so called Fischer-Tropsch process. An example of such process is disclosed in WO 2002/102941, EP 1 498 469, WO 2004/009739 and WO 2013/064539.

WO 2000/11113 discloses a process to prepare Fischer-Tropsch derived wax products, by feeding a Fischer-Tropsch derived paraffinic into a distillation column, followed by operating the distillation column to produce wax products, which wax products are withdrawn from the distillation column.

A problem of the process disclosed in WO 2000/11113 is that although this process delivers wax products, the wax products do not have a sufficiently high melting point and/or are not refined enough to be used in applications such as hot melt adhesives, polyvinylchloride (PVC) extrusion lubricant, inks, paints, coatings, tires, cosmetics and pharmaceuticals in an advantageous way.

It is an object of the invention to solve or minimize at least of one of the above problems. It is a further object of the present invention to provide a paraffin wax which can be advantageously used in applications such as hot melt adhesives, PVC and inks.

Moreover, an object of the present invention is to provide an efficient method for preparing refined paraffin wax product with a high congealing point in a high yield. One of the above or other objects may be achieved according to the present invention by providing a paraffin wax having a congealing point according to ASTM D938 of at least 100° C. and a Saybolt colour according to ASTM D156 of at least 25 cm.

It has now surprisingly been found according to the present invention that the paraffin wax has a sufficiently high melting point and is fully refined wax and which may be advantageously used in hard wax applications.

An important advantage of the present invention is that the paraffin wax may be advantageously used in hard wax applications such as hot melt adhesives, polyvinylchloride (PVC) extrusion lubricant, inks, paints, coatings, tires, cosmetics and pharmaceuticals.

In another embodiment of the present invention there is provided a process to prepare Fischer-Tropsch paraffin waxes.

An advantage of said process according to the present invention is that by distilling the Fischer-Tropsch derived feed without a preceding hydrogenation step results in paraffin waxes which have high congealing points (=hard waxes) and high Saybolt colours.

The relation between hydrogenation of the Fischer-Tropsch derived feed and the Saybolt colour of Fischer-Tropsch derived waxes is for example described on page 181 in the "Handbook of Commercial Catalysts, Heterogeneous catalysts", Howard F. Rase, CRC Press LLC, Florida, 2000, ISBN 0-8493-9417-1.

A further advantage is that the hydrogenated Fischer-Tropsch product stream is more stable with respect to product degradation in subsequent distillation steps. Degradation may be caused by exposure to high temperature and by oxygen ingress in vacuum columns. Hydrogenation generally results in higher quality of the normal paraffinic products, e.g. in terms of colour or odour.

For applications where a congealing point of above 108° C. is required currently poly-ethylene (PE) or poly-propylene (PP) waxes are used.

Another advantage is that the ability to produce Fischer-Tropsch derived paraffin waxes with a congealing point of above 108° C. can provide a cost effective alternative.

The following detailed description does not limit the invention. Instead, the scope of the invention is defined by the appended claims.

According to the present invention, a paraffin wax has a congealing point according to ASTM D938 of at least 100° C.

The paraffin wax comprises primarily n-paraffins. The paraffin wax according to the present invention comprises more than 85 wt. % of n-paraffins, preferably more than 90 wt. % of n-paraffins.

Paraffin waxes are known and described for example in U.S. Pat. No. 2,692,835, WO2002/102941, EP 1 498 469 and WO 2004/009739.

Suitably, the paraffin wax according to the present invention has a congealing point according to ASTM D938 in the range of from 100 to 120° C.

Also, the paraffin wax according to the present invention has a congealing point according to ASTM D938 of at least 108° C. Preferably the paraffin wax according to the present invention has a congealing point according to ASTM D938 of at least 110° C.

Further, the paraffin wax according to the present invention has a Saybolt colour according to ASTM D156 of at least 25 cm.

Preferably, the paraffin wax according to the present invention has a Saybolt colour according to ASTM D156 of at least 30 cm.

Typically, the Saybolt colour scale is used to quantify colour intensity for mildly coloured substances in liquid state. For this objective waxes are molten for measurement. The scale runs from <−16 cm to >30 cm. >30 cm means water white. The higher the number the better (i.e. the lesser) the colour.

The paraffin wax according to the present invention has preferably an oil content according to ASTM D721 of less than 0.5 wt. %, more preferably less than 0.3 wt. %, and most preferably less than 0.25 wt. %.

Suitably, the kinematic viscosity of the paraffin wax according the present invention at 120° C. according to ASTM D445 is above 15 mm$^2$/s.

It is preferred that the paraffin wax according to the present invention is a Fischer-Tropsch derived paraffin wax.

The Fischer-Tropsch derived paraffin wax is derived from a Fischer-Tropsch process. Fischer-Tropsch product stream is known in the art. By the term "Fischer-Tropsch derived" is meant a paraffin wax is, or is derived from a Fischer-Tropsch process. A Fischer-Tropsch derived paraffin wax may also be referred to a GTL (Gas-to-Liquids) product. An example of a Fischer-Tropsch process is given in WO2002/102941, EP 1 498 469 and WO2004/009739, the teaching of which is incorporated by reference.

The Fischer-Tropsch derived paraffin wax comprises paraffins, primarily n-paraffins. Preferably, the Fischer-Tropsch derived paraffin wax comprises more than 85 wt. % of n-paraffins, preferably more than 90 wt. % of n-paraffins.

In a further aspect, the present invention provides a process to prepare a Fischer-Tropsch derived paraffin wax, the process at least comprising the following steps:
(a) providing a Fischer-Tropsch product stream comprising paraffins having from 10 to 300 carbon atoms;
(b) separating the Fischer-Tropsch product stream of step (a), thereby obtaining at least a fraction comprising 10 to 17 carbon atoms and a fraction comprising 18 to 300 carbon atoms;
(c) subjecting the fraction comprising 18 to 300 carbon atoms of step (b) to a hydrogenation step, thereby obtaining a hydrogenated fraction comprising 18 to 300 carbon atoms;
(d) separating the hydrogenated fraction comprising 18 to 300 carbon atoms of step (c), thereby obtaining one or more first light waxes having a congealing point in the range of 30 to 75° C. and a second heavy wax having a congealing point in the range of 75 to 120° C.;
(e) separating the heavy wax of step (d) to obtain a residual wax fraction having a congealing point of at least 100° C., preferably of at least 108° C., more preferably of at least 110° C.
f) hydrofinishing the residual wax fraction of step (e) thereby obtaining a hydrofinished wax fraction having a congealing point of at least 100° C., preferably at least 108° C., more preferably at least 110° C.

In step (a) of the process according to the present invention a Fischer-Tropsch product stream comprising paraffins having from 10 to 300 carbon atoms is provided.

By the part "a Fischer-Tropsch product stream comprising paraffins having from 10 to 300 carbon atoms is meant 10 to 300 carbon atoms per molecule.

The Fischer-Tropsch product stream as provided in step (a) is derived from a Fischer-Tropsch process. Fischer-Tropsch product stream is known in the art. By the term "Fischer-Tropsch product" is meant a synthesis product of a Fischer-Tropsch process. In a Fischer-Tropsch process synthesis gas is converted to a synthesis product. Synthesis gas or syngas is a mixture of hydrogen and carbon monoxide that is obtained by conversion of a hydrocarbonaceous feedstock. Suitable feedstock include natural gas, crude oil, heavy oil fractions, coal, biomass and lignite. A Fischer-Tropsch product derived from a hydrocarbonaceous feedstock which is normally in the gas phase may also be referred to a GTL (Gas-to-Liquids) product. The preparation of a Fischer-Tropsch product has been described in e.g. WO2003/070857.

The product stream of the Fischer-Tropsch process is usually separated into a water stream, a gaseous stream comprising unconverted synthesis gas, carbon dioxide, inert gasses and C1 to C3, and a C4+ stream.

The full Fischer-Tropsch hydrocarbonaceous product suitably comprises a C1 to C300 fraction.

Lighter fractions of the Fischer-Tropsch product, which suitably comprises C3 to C9 fraction are separated from the Fischer-Tropsch product by distillation thereby obtaining a Fischer-Tropsch product stream, which suitably comprises C10 to C300 fraction.

The weight ratio of compounds having at least 60 or more carbon atoms and compounds having at least 30 carbon atoms in the Fischer-Tropsch product is preferably at least 0.2, more preferably 0.3.

Suitably, in case of preparation of Fischer-Tropsch derived wax fraction having a congealing point of above 90° C. weight ratio is at least 0.5.

The weight ratio in the Fischer-Tropsch product may lead to Fischer-Tropsch derived paraffin waxes having a low oil content.

In step (b) of the process according to the present invention the Fischer-Tropsch product stream of step (a) is separated to obtain at least a fraction comprising 10 to 17 carbon atoms and a fraction comprising 18 to 300 carbon atoms.

The separation is preferably performed by means of a distillation at atmospheric or slightly below atmospheric pressure conditions. It is preferred that the distillation is carried out at a pressure of 500 mbara to atmospheric and a temperature of 250 to 330° C. in the bottom section of the column.

In step (c) of the process according to the present invention the fraction comprising 18 to 300 carbon atoms of step (b) is subjected to a hydrogenation step, thereby obtaining a hydrogenated fraction comprising 18 to 300 carbon atoms. The hydrogenation is suitably carried out at a temperature between 200 and 275° C. and at a pressure between 20 and 70 bar.

Typical hydrogenation conditions for hydrogenation of the above Fischer-Tropsch product are described in e.g. WO2007/082589.

In step (d) of the process according to the present invention the hydrogenated fraction comprising 18 to 300 carbon atoms of step (c) is separated to obtain one or more first light waxes having a congealing point in the range of 30 to 75° C. and a second heavy wax having a congealing point in the range of 75 to 120° C.

By light wax is meant wax having a congealing point in the range of from 30 to 75° C. By heavy wax is meant wax having a congealing point in the range of from 75 to 120° C.

Suitably, the hydrogenated fraction comprising 18 to 300 carbon atoms of step (c) is separated by vacuum distillation at a pressure between 5 and 20 mbar, preferably between 5 and 15 mbar, and more preferably between 10 and 15 mbar. Also the distillation is preferably carried out at a temperature of from 300 to 350° C.

Preferably, the first light one or more waxes are obtained as distillate and/or side cuts in vacuum distillation, e.g. a first light wax fraction having a congealing point in the range of from 30 to 35° C., a second light wax fraction having a congealing point in the range of from 50 to 60° C., and a third light wax fraction having a congealing point in the range of from 65 to 75° C.

Suitably, the first light wax fraction is obtained as top cut of the vacuum distillation, the second light wax fraction is obtained as a side cut of the vacuum distillation and the third light wax fraction is obtained as heavier side cut of the vacuum distillation.

Preferably, one or more light wax fractions having a congealing point in the range of from 30 to 75° C. of step (d) are hydrofinished thereby obtaining one or more hydrofinished wax fractions having a congealing point in the range of from 30 to 75° C. Suitably, a wax fraction having a congealing point in the range 30 to 75° C. is hydrofinished thereby obtaining a hydrofinished wax fraction having a congealing point in the range of from 30 to 75° C.

Optionally, the first and second light wax fractions are hydrofinished thereby obtaining a first light hydrofinished wax fraction having a congealing point in the range of from 30 to 35° C., and a second light hydrofinished wax fraction having a congealing point in the range of from 50 to 60° C.

Preferably at least the third light wax i.e. the heaviest side cut of the vacuum distillation step is hydrofinished thereby obtaining a hydrofinished wax fraction having a congealing point in the range of 65-75° C.

Typical hydrofinishing conditions for hydrofinishing of the above fractions are described in e.g. WO2007/082589.

In step (e) of the process according to the present invention, the second heavy wax of step (d) is separated, thereby obtaining a residual wax fraction having a congealing point of at least 100° C., preferably of at least 108° C., more preferably of at least 110° C.

Preferably, the second heavy wax of step (d) is separated, thereby obtaining at least one distillate wax fraction having a congealing point in the range of from 75 to 85° C. and at least one residual wax fraction having a congealing point from 95 to 120° C.

Preferably, the heavy second wax of step (d) is separated, thereby obtaining at least one distillate wax fraction having a congealing point in the range of from 70 to 90° C., preferably 70 to 85° C. and more preferably 75 to 85° C.

Suitably, the heavy distillate wax fraction having a congealing point in the range of from 75 to 85° C. is hydrofinished thereby obtaining a hydrofinished heavy distillate wax fraction having a congealing point in the range of from 75 to 85° C.

Further, the heavy distillate wax fraction having a congealing point in the range of from 70 to 90° C., preferably in the range of from 70 to 85° C. and more preferably in the range of from 75 to 85° C. are hydrofinished thereby obtaining hydrofinished heavy distillate wax fraction having a congealing point in the range of from 70 to 90° C., preferably in the range of from 70 to 85° C. and more preferably in the range of from 75 to 85° C.

In step (f) of the process according to the present invention the residual wax having a congealing point of at least 100° C., preferably at least 108° C., more preferably at least 110° C. is hydrofinished thereby obtaining a hydrofinished residual wax fraction having a congealing point of at least 100° C., preferably at least 108° C., more preferably at least 110° C.

Preferably, the heavy residual wax fraction having a congealing point in the range of from 95 to 120° C. is hydrofinished thereby obtaining a hydrofinished heavy residual wax fraction having a congealing point in the range of from 95 to 120° C.

Typical hydrofinishing conditions for hydrofinishing of the above fractions are described in e.g. WO2007/082589.

The heavy second wax of step (e) is preferably separated by short path distillation at a pressure between 0.05 and 0.5 mbar, and more preferably between 0.1 and 0.3 mbar. The distillation is preferably carried WO 2016/107861 PCT/EP2015/081331 out at a temperature of from 200 to 350° C. and more preferably from 250 to 300° C.

Typically, the residual heavy wax having a congealing point in the range of from 95 to 120° C. is obtained as the residual fraction of the short path distillation. By the term residual is meant a fraction obtained with distillation which is a residual bottom fraction and is neither a top cut nor a side cut.

Short path distillation, also known as molecular distillation is known in the art and therefore not described here in detail. An example of a form of short path distillation is a Wiped Film Evaporator. Typical short path distillations are for example described in Chapter 9.1 in "Distillation, operations and applications", Andrzej Górak and Hartmut Schoenmakers, Elsevier Inc, Oxford, 2014.

FIG. 1 schematically shows a process scheme of the process scheme of a preferred embodiment of the process according to the present invention.

For the purpose of this description, a single reference number will be assigned to a line as well as a stream carried in that line.

The process scheme is generally referred to with reference numeral 1.

In a Fischer-Tropsch process reactor a Fischer-Tropsch product stream is obtained (not shown). This product is separated in a distillation column 2 into at least a fraction 10 comprising 10 to 17 carbon atoms and a fraction 20 comprising 18 to 300 carbon atoms. Fraction 20 is fed to a hydrogenation reactor 3 wherein fraction 20 is converted to a hydrogenated fraction 30. Fraction 30 is distilled in a vacuum distillation column 4 to recover one or more wax fractions 40 having a congealing point in the range of from 30 to 75° C. and a heavy fraction 50 with a congealing point of 110° C. Fractions 40 is fed to a hydrofinishing reactor 5 wherein fractions 40 is converted to hydrofinished fractions 60 having a congealing point in the range of from 30 to 75° C.

Heavy wax 50 is distilled in a short path distillation column 6 to recover a heavy wax fraction 70 having a congealing point of 110° C.

Fraction 70 is fed to a hydrofinishing reactor 7 wherein fraction 70 is converted to a hydrofinished fraction 80 having a congealing point of 110° C.

The fraction 10 is fed to a hydrogenation reactor 8 wherein fraction 10 is converted to a hydrogenated fraction 90 comprising 10 to 17 carbon atoms.

The present invention is described below with reference to the following Examples, which are not intended to limit the scope of the present invention in any way.

EXAMPLES

Example

Preparation of Fischer-Tropsch Derived Paraffin Wax Fractions Having a Congealing Point of 110° C.

A Fischer-Tropsch derived paraffin wax having a congealing point of 110° C. was obtained using a Fischer-Tropsch process. To this end a Fischer-Tropsch effluent was prepared according to the method described in U.S. Pat. No. 6,858,127. Based on C1+ hydrocarbons the effluent had a C30+ content of 51.1% m and a C60+ content of 28.5% m.

The effluent was separated in a fraction A which is in the gas phase at ambient conditions and a fraction B which is in the liquid or solid phase at ambient conditions.

For all distillations described below care was taken to avoid temperatures above 370° C. for any part of the distillation equipment in contact with hydrocarbons and to avoid contact of hydrocarbons with oxygen. All distillations described below were carried out in a continuous mode.

Fraction B was subjected to a distillation at atmospheric pressure yielding a top stream comprising a fraction containing molecules with 9 or less carbon atoms, a side cut C containing molecules with 10 to 17 carbons atoms and a bottom stream D containing molecules with 18 to 300 carbon atoms. The effective cutpoint for the separation between streams C and D was 310° C.

Fraction C was hydrogenated over a nickel catalyst as described in WO 2007/082589 (Catalyst G). Process conditions were: a weight hourly space velocity (WHSV) of 1.0 kg/l/h, 30 bar of pure hydrogen at reactor inlet, a hydrogen over feedstock ratio of 1000 Nl/kg and a temperature of 220° C.

The hydrogenated product was separated in a fraction E which is in the gas phase at ambient conditions and a fraction F which is in the liquid phase at ambient conditions. Fraction F consists of hydrogenated normal paraffins in the C10 to C17 range.

The residue of the atmospheric distillation (fraction D) was subjected hydrogenated over a nickel catalyst as described in WO 2007/082589 (Catalyst G). Process conditions were: a weight hourly space velocity (WHSV) of 1.0 kg/l/h, 30 bar of pure hydrogen at reactor inlet, a hydrogen over feedstock ratio of 1000 Nl/kg and a temperature of 220° C.

The hydrogenated product was separated in a fraction G which is in the gas phase at ambient conditions and a fraction H which is in the solid phase at ambient conditions. Fraction H consists of hydrogenated normal paraffins in the C18 to C300 range.
Fraction H is subjected to a vacuum distillation. The distillation was run at a bottom temperature of 320° C. and a pressure of 15 mbar. The effective cutpoint between bottom stream and heaviest distillate was 490° C. Several refined waxes were obtained as distillates of which the heaviest was subjected to a hydrofinishing operation over a nickel catalyst as described in WO 2007/082589 (Catalyst G). Process conditions were: a weight hourly space velocity (WHSV) of 1.0 kg/l/h, 60 bar of pure hydrogen at reactor inlet, a hydrogen over feedstock ratio of 1000 Nl/kg and a temperature of 240° C.

The residue of this vacuum distillation (fraction J) is subjected to a short path distillation with an effective cut point of 540° C. The distillation was run at 0.2 mbar and 260° C. The residue of the short path distillation (fraction K) is subjected to a hydrofinishing operation over a nickel catalyst as described in WO 2007/082589 (Catalyst G). Process conditions were: a weight hourly space velocity (WHSV) of 1.0 kg/l/h, 60 bar of pure hydrogen at reactor inlet, a hydrogen over feedstock ratio of 1000 Nl/kg and a temperature of 240° C. The product was separated in a fraction L which is in the gas phase at ambient conditions and a fraction M which is in the solid phase at ambient conditions. Fraction M is obtained as a refined wax with a congealing point of about 110° C. The yield of fraction M was 39.5% m of the Fischer-Tropsch effluent on a hydrocarbon basis.

TABLE 1

| Paraffin wax product (fraction L) | |
|---|---|
| Congealing point, ° C. According to ASTM D938 | 110.3 |
| Oil content, % w, According to ASTM D721 | 0.21 |
| Saybolt colour[a], cm According to ASTM D156 | 30+ |
| Kinematic viscosity at 120° C., mm2/s According to ASTM D445 | 25.4 |

[a]The Saybolt colour scale is used to quantify colour intensity for mildly coloured substances in liquid state. For this objective waxes are molten for measurement. The scale runs from <−16 cm to >30 cm. >30 cm means water white. The higher the number the better (i.e. the lesser) the colour.

DISCUSSION

The results in Table 1 show that starting from a hydrogenated Fischer-Tropsch effluent having C30+ content of 51.1% m and a C60+ content of 28.5% m a Fischer-Tropsch derived paraffin wax having a congealing point of about 110° C. was obtained. Furthermore, the paraffin wax has a low oil content and a high Saybolt colour.

These observations indicate that the obtained refined Fischer-Tropsch paraffin wax can be advantageously used in applications such as hot melt adhesives, PVC lubricant and inks.

That which is claimed is:

1. A paraffin wax suitable for a hard wax application, the paraffin wax having a congealing point according to ASTM D938 of at least 108° C., a kinematic viscosity of at least 15 mm$^2$/s at 120° C., and a Saybolt colour according to ASTM D156 of at least 25.

2. A paraffin wax according to claim 1, having a congealing point according to ASTM D938 of at least 110° C.

3. A paraffin wax according to claim 1, having a Saybolt colour according to ASTM D156 of at least 30.

4. A paraffin wax according to claim 1, having an oil content according to ASTM D721 of less than 0.5 wt. %.

5. A paraffin wax according to claim 1, wherein the paraffin wax is a Fischer-Tropsch derived paraffin wax.

6. A paraffin wax according to claim 1, having an oil content according to ASTM D721 of less than 0.3 wt. %.

7. A paraffin wax according to claim 1, having an oil content according to ASTM D721 of less than 0.25 wt. %.

8. A paraffin wax according to claim 1, wherein the paraffin wax is used in hard wax applications including at least one of a hot melt adhesive, a polyvinylchloride extrusion lubricant, an ink, a paint, a coating, a tire, a cosmetic, and a pharmaceutical.

9. A paraffin wax suitable for a hard wax application, the paraffin wax having a congealing point according to ASTM D938 in the range of from 100 to 120° C., a kinematic viscosity of at least 15 mm$^2$/s at 120° C., and a Saybolt colour according to ASTM D156 of at least 30.

10. A paraffin wax according to claim 9, having a congealing point according to ASTM D938 of at least 108° C.

11. A paraffin wax according to claim 9, having a congealing point according to ASTM D938 of at least 110° C.

12. A paraffin wax according to claim 9, having an oil content according to ASTM D721 of less than 0.5 wt. %.

13. A paraffin wax according to claim 9, wherein the paraffin wax is a Fischer-Tropsch derived paraffin wax.

14. A paraffin wax according to claim 9, having an oil content according to ASTM D721 of less than 0.3 wt. %.

15. A paraffin wax according to claim 9, having an oil content according to ASTM D721 of less than 0.25 wt. %.

16. A paraffin wax according to claim 9, wherein the paraffin wax is used in hard wax applications including at least one of a hot melt adhesive, a polyvinylchloride extrusion lubricant, an ink, a paint, a coating, a tire, a cosmetic, and a pharmaceutical.

* * * * *